United States Patent [19]
Brooks

[11] 3,765,512
[45] Oct. 16, 1973

[54] BRAKE ACTUATING AND ADJUSTING MECHANISM

[75] Inventor: Frank W. Brooks, Dayton, Ohio

[73] Assignee: General Motors Corporation, Detroit, Mich.

[22] Filed: Oct. 30, 1972

[21] Appl. No.: 302,083

[52] U.S. Cl. ............................. 188/71.8, 188/196 P
[51] Int. Cl. ............................................. F16d 65/54
[58] Field of Search ...................... 188/71.8, 106 F, 188/106 P, 196 P

[56] References Cited
UNITED STATES PATENTS

| | | | |
|---|---|---|---|
| 2,951,560 | 9/1960 | Smellie | 188/71.8 |
| 3,556,267 | 1/1971 | Hall | 188/196 P |
| 3,724,605 | 4/1973 | Naismith | 188/71.8 |

*Primary Examiner*—Duane A. Reger
*Attorney*—W. S. Pettigrew et al.

[57] ABSTRACT

A brake mechanism having a pressure actuated piston moving disc brake pad assemblies into braking engagement with a disc for service brake operation, and a mechanically actuated mechanism which mechanically moves the piston to engage the brake pad assemblies with the disc for a parking brake operation. The mechanical mechanism includes a one-way lock means mounted on a rotatable and axially movable shaft so that it maintains brake adjustment by sliding on the shaft with excess movement of the piston in the brake engaging direction, but locks on the shaft to prevent movement of the piston in the brake release direction beyond a small predetermined amount sufficient to establish brake pad and disc clearance. The piston is normally nonrotatable in its cylinder, but holding means preventing substantial piston rotation may be released to activate reset means for the one-way lock means so that rotational movement of the piston engages the one-way lock means and prevents it from locking on the shaft so as to permit movement of the piston into the cylinder to reset the piston position when new brake linings have been installed.

2 Claims, 3 Drawing Figures

PATENTED OCT 16 1973　　　　　　　　　　　　　　3,765,512
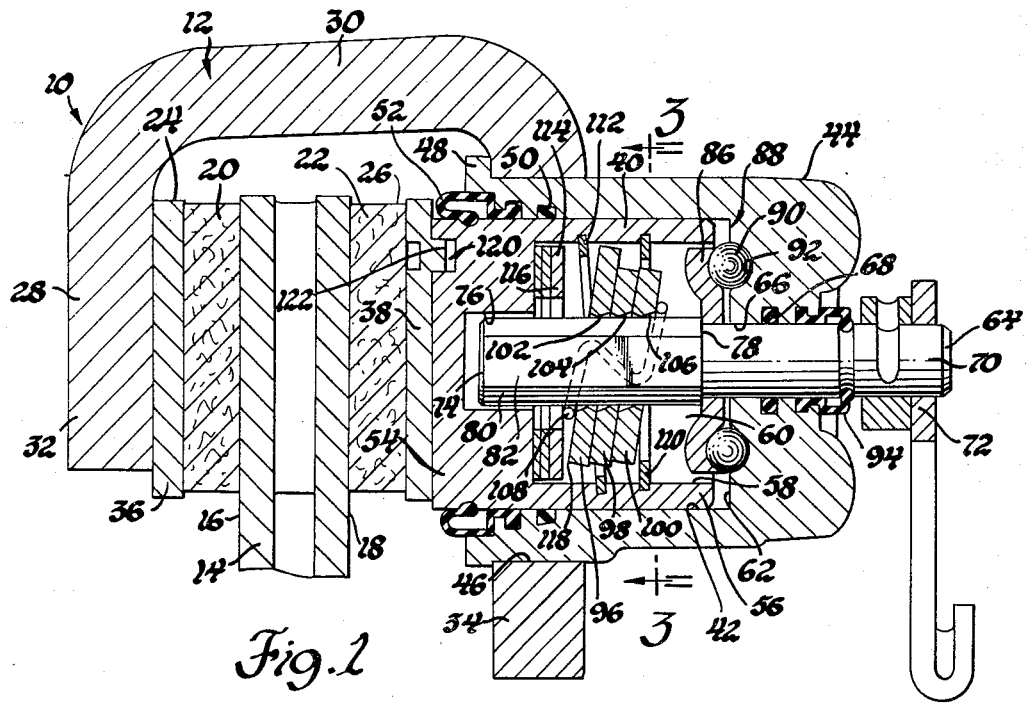
Fig.1
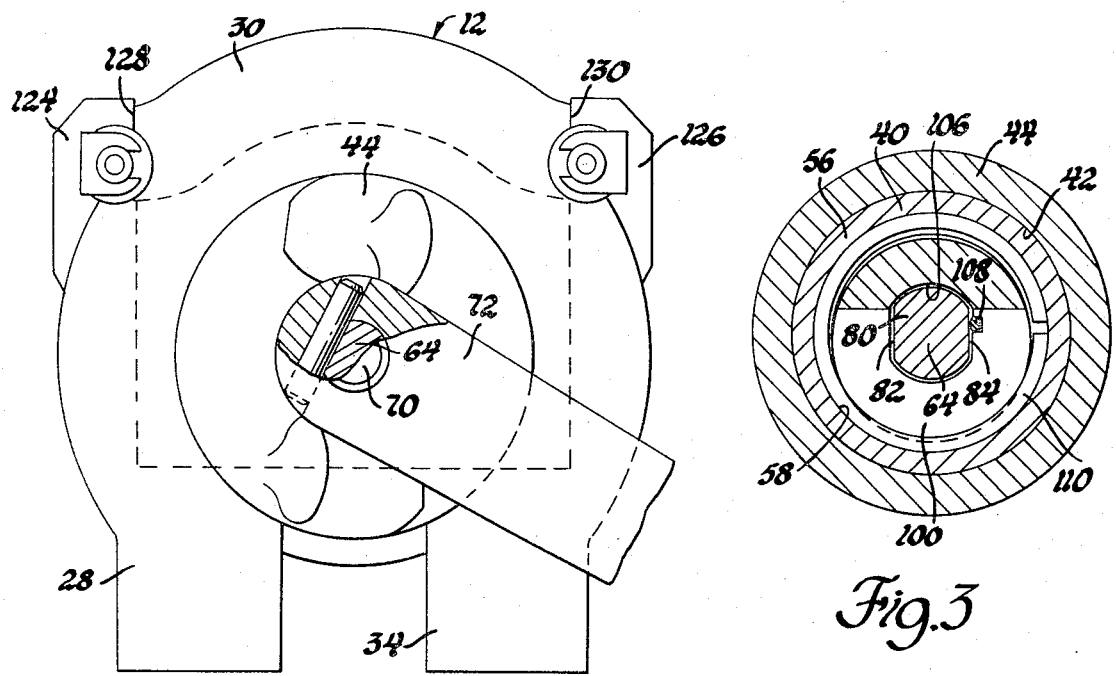
Fig.2
Fig.3

BRAKE ACTUATING AND ADJUSTING MECHANISM

The invention relates to a mechanism for actuating the brake shoes of a pressure actuated disc brake assembly so as to maintain brake adjustment and to also actuate the brake by manual application to provide a parking brake mode of operation. The parking brake mechanism changes rotational or arcuate motion of an actuated lever to linear motion of the pressure actuated piston, and provides an arrangement for compensating for brake lining wear and also for compensating for brake lining swell or growth. A one-way lock means, mounted on the rotatable and axially movable shaft controlled by the manually operated lever, is utilized, the lock means being capable of moving with the piston under normal hydraulic actuation of the brake system, when adjustment is needed to the extent necessary to engage the shoes with the disc, but locking on the shaft when the piston is released, so as to prevent substantial return movement of the piston into the cylinder. This action maintains brake adjustment each time the hydraulic mechanism is actuated for service brake operation. When the shaft is rotated by the lever, a suitable mechanism such as a ball-ramp actuating device also imparts axial movement to the shaft, moving the locked one-way lock means with the shaft and engaging the lock means with the piston, and then moving the piston axially to actuate the brake system. The piston and its immediately associated brake pad assembly are so arranged that the piston cannot rotate to any substantial extent in the cylinder. Since the piston is provided with a reset mechanism for the lock means, the reset mechanism is actuated by rotational movement of the piston after the associated brake pad assembly has been removed. The reset mechanism includes a ramp arrangement which engages the one-way lock means so as to position the lock means relative to the shaft so that the lock means can slide on the shaft as the piston is moved inwardly into the cylinder a distance necessary for installation and use of a new set of brake linings. The piston will then be rotated back to its original position, the new linings installed, and the brake assembly will be rendered ready for operation. Upon the first hydraulic actuation, the assembly will be properly adjusted, and it will also be adjusted each time the brakes are hydraulically actuated.

IN THE DRAWING

FIG. 1 is a cross-section view, with parts broken away, showing a disc brake assembly embodying the invention.

FIG. 2 is an elevation view, with parts broken away and in section of the brake assembly of FIG. 1. FIG. 3 is a cross-section view of the portion of the brake assembly of FIG. 1 taken in the direction of arrows 3—3 of that Figure.

The brake assembly 10 includes a caliper assembly 12 and a disc 14. The disc has opposed friction surfaces 16 and 18 which are arranged to be engaged for braking purposes by the linings 20 and 22 of the brake pad assemblies 24 and 26. The caliper frame 28 is generally U-shaped, with a bridge section 30 joining legs 32 and 34. Leg 32 is the outboard leg, and engages the backing plate 36 of the brake pad assembly 24. The backing plate 38 of the brake pad assembly 26 is arranged to be engaged by a piston 40, which is reciprocally mounted in a cylinder 42 formed in a housing 44. Housing 44 is suitably secured and mounted in the inboard caliper frame leg 34. In the particular construction illustrated, an opening 46 receives the housing 44 therethrough, the housing being provided with a flange 48 which prevents axially outward movement of the housing once it is in place. The cylinder 42 opens toward disc 14. The piston 40 is suitably sealed to prevent fluid leakage by seal 50, and the boot 52 prevents contaminants from entering the cylinder. The piston 40 has a head 54 and a skirt section 56 extending from the head and into the cylinder 42. The recess 58 contained within skirt 56 is a part of the pressurizing chamber 60 defined by piston 40, cylinder 42, and the base wall 62 of cylinder 42, which is a part of the housing 44.

The actuating shaft 64 extends through an opening 66 which is axially aligned with cylinder 42 and piston 40. Shaft 64 is both rotatable and axially movable through opening 66, a suitable seal 68 being provided to seal the opening 66 about the shaft 64. The outer end 70 of shaft 64 has secured thereto an actuating lever 72 which is in turn attached by suitable means such as a cable to a parking brake control mechanism operated by the vehicle operator. When the lever 72 is moved arcuately, actuating shaft 64 is rotated. The inner end 74 of actuating shaft 64 extends into pressure chamber 60 and recess 58 of piston 40. The piston head 54 is provided with a small recess 76 into which shaft end 74 also extends. A shoulder 78 separates the portion of actuating shaft 64 which is contained within opening 66 and an enlarged section 80 which terminates at shaft inner end 74. Opposed flat surfaces 82 and 84 are provided on section 80 for purposes to be described. An annular flange member 86 fits about shaft 64 so that one side abuts against shoulder 78. Flange 86 is part of a ball-ramp actuating mechanism 88, and has depressions receiving actuator balls 90 therein. Base wall 62 is provided with ball ramps 92 also receiving balls 90 so that when rotation of shaft 64 is affected by arcuate movement of lever 72, the balls ride up the ramps, causing the shaft 64 to move axially toward piston 40. A resilient seal and return element 94 is fixed to housing 44 at the exterior end of opening 66 and is also fixed to actuating shaft 64. Element 94 not only seals the actuating shaft and opening 66, but, being resilient, also acts as a return spring so that when lever 72 is released, there is a return force exerted on shaft 64, causing it to move axially away from piston 40 and to the position shown in FIG. 1 of the drawing. This movement is concurrent with movement of balls 90 back down ramps 92.

A one-way locking arrangement is provided between the piston 40 and the actuating shaft 54. The particular locking means disclosed includes a lock plate pack formed by a plurality of lock plates, three such plates 96, 98 and 100 being illustrated. As is better seen in FIG. 3, the lock plates are generally annular with their respective openings 102, 104 and 106 being shaped to conform to the cross-section shape of the enlarged section 80 of actuating shaft 54, which contains flat surfaces 82 and 84. Openings 102, 104 and 106 are formed with their axes at an oblique angle to the plate axes, and fit shaft enlarged section 80 so that the plates are positioned on the shaft at an oblique angle, in the manner shown in FIG. 1. The openings are also beveled on their opposite sides so that the arcuate portions of the openings at the upper and lower sides, as seen in FIGS. 1 and 3, have relatively sharp edge presentations to the surface of the shaft enlarged section 80 but not so sharp as would be the case without the bevels. The spring 108 fits about the lock plate in such a manner that it tends to hold the lock plates together and urges them toward the perpendicular relative to the axis of shaft section 80 so that they are locked on the shaft.

A lock plate retainer 110, which may be a snap ring, is fitted within the recess 58 formed by piston skirt 56 and is so spaced from the piston head 54 as to permit reception of the lock plates generally between the piston head 54 and the retainer 110. As can be seen in FIG. 1, the annular width along the radius of each of the lock plates 98 and 100 is such that the lock plates on their upper surfaces will fit underneath the retainer 110, while the diametrically opposite portions of these lock plates are somewhat wider so that the lower edge of lock plate 100 most immediately adjacent retainer 110 would engage the retainer if the lock plate or the retainer were moved sufficiently axially. The upper portion of lock plate 96 extends radially outward a somewhat greater distance so that it is of greater total radius than the inner radius of retainer 110. A ramp member 112, which also may be a snap ring, is likewise installed in recess 58 and is positioned between retainer 110 and the piston head 54. The ramp member is positioned at an oblique angle to the axis of the piston and the actuating shaft, with the upper portion of the ramp, as seen in FIG. 1, being closer to the piston head than its lower portion. The lower sides of all of the lock plates are of insufficient radial width to engage the lower portion of ramp member 112. However, the upper portion of lock plate 96 is of sufficient radial width so as to be engageable with ramp 112 as more particularly described below. A thrust member 114, which may be a thrust washer assembly or a needle bearing type thrust member, is positioned against the inner side of the piston head 54 and has its outer element 116 engageable by the lower corner of lock plate 96, this lower corner constituting a force point 118.

The outer surface of piston head 54 engaging backing plate 38 of brake pad assembly 26 is provided with one or more recesses 120 which are engaged by lugs or bosses 122 formed on or struck from backing plate 38 so as to prevent any substantial rotational movement of piston 40 in cylinder 42. As can better be seen in FIG. 2, the backing plates 36 and 38 extend circumferentially a somewhat greater distance than do the linings 20 and 22. The backing plates are provided with ears 124 and 126 at opposite circumferentially extending ends thereof, these ears engaging the side surfaces 128 and 130, respectively, of the bridge section 30 of the caliper frame 28. Thus the brake torque is transmitted from the brake pad assemblies to the caliper frame by the brake shoe ears 124 and 126, and none of the torque is transmitted to the caliper frame through the piston 40. This arrangement also prevents any substantial circumferential movement of the brake show assembly 26, and consequently bosses 122 and recesses 120 prevent any substantial rotational movement of the piston.

During normal brake operation, hydraulic pressure is introduced into pressure chamber 60 in order to actuate the brake for service operation. The pressure acts on piston 40 to move the piston toward disc 14, engaging brake lining 22 with the friction surface 18 of the disc. At the same time the hydraulic reaction causes the caliper assembly to move rightwardly as seen in FIG. 1, if a sliding caliper arrangement is used, so that leg 28 of the caliper frame 30 forces the friction lining 20 into frictional engagement with the friction surface 16 of disc 14, thereby applying braking force to the disc. The leftward movement of piston 40, with the brake properly adjusted, usually results in so little movement as to require no additional adjustment. However, upon initial installation of the brake linings or upon sufficient brake lining wear, this movement will be such that retainer 110 will engage the lower edge of lock plate 100, causing the lock plates to slide on the enlarged section 80 of actuating shaft 64 leftwardly relative to that shaft. Upon brake release, when the piston 40 tends to withdraw into cylinder 42, the piston will move only a sufficient amount to engage the thrust element 116 with the lower left edge of lock plate 96 at force point 118. This engagement causes all of the lock plates of the lock plate pack to lock on shaft enlarged section 80, preventing further movement of piston 40 into cylinder 42 and toward actuating shaft 64. Thus the piston is permitted to retract only the amount of the predetermined clearance between force point 118 and the thrust element 116.

When the brake is applied manually the cable load on lever 72 is increased, causing the lever to move arcuately to rotate actuating shaft 64. Due to the action of the ball-ramp actuator 88, the shaft also moves axially inward in relation to the cylinder 42, toward piston head 54. The force point 118 of the lock plate pack, and particularly of lock plate 96, contacts the thrust element 116, which in turn causes the piston 40 to move outwardly against the brake pad assembly 26. The lock plate pack remains axially stationary in relation to the actuating shaft due to the locking action created between the outer diameter of the shaft enlarged section 80 and the close fitting openings 102, 104 and 106 in the lock plates 96, 98 and 100. Therefore, as the lining wears, the parking lever continues to operate within a fixed range. Since the brake will be adjusted each time it is hydraulically actuated, and since service brake operations normally occur numerous times between parking brake operations, the brake is always sufficiently closely adjusted to permit full parking brake operation.

When the piston 40 must be reset to its initial position because of installation of new linings, the old brake shoe assembly 26 is removed and the piston is rotated approximately 90° to 180° so that the ramp 112 has a section moving axially toward the upper left edge of lock plate 96. When the ramp engages the upper left lock plate edge, and moves it slightly axially the lock plates are released from the shaft and are held in a released or unlocked position so that they allow the lock plate pack to be pushed toward the cylinder base wall 62 as the piston is pushed in that direction. After the brake pad assemblies with new linings are installed and the brake is again placed in operation, the first hydraulic actuation of the brake will cause the lock plates to again be positioned so as to maintain adjustment of the piston and therefore minimum clearance between brake shoes 20 and 22 in relation to their respective disc friction surfaces 16 and 18, upon brake release.

What is claimed is:

1. In a disc brake actuator and adjuster mechanism: a pressure actuated member reciprocably movable in brake actuating and release directions;
a mechanically actuated member axially aligned with said pressure actuated member and reciprocably movable in brake actuating and release directions;

one-way lock means mounted on one of said members and operatively engageable with the other of said members to selectively slide in relation to one of said members when the axial relative movement of said members, generated by movement of either member is in an opening direction relative to the other member, said lock means being operatively engageable with the other of said members to lock said members in axial force transmitting relation therebetween upon a predetermined amount of axial relative movement of said members generated by movement of either member in a closing direction relative to the other member;

normally inactive member reset means for said one-way lock means mounted on one of said members and actuated by rotational movement of the one member on which it is mounted to engage said lock means and prevent the locking thereof and permit relatively closing axial movements of said members to reset said members; and means associated with the one of said members on which said reset means is mounted and normally preventing rotatable movement thereof and when released permitting at least sufficient rotational movement thereof to actuate said reset means.

2. A brake actuator and adjuster mechanism comprising:

a housing having a wheel cylinder formed therein and defined by a cylinder wall and a base;

a brake actuating piston reciprocably received in said wheel cylinder and cooperating with said cylinder wall and base to define a brake actuating pressure chamber, said piston having a head and a recessed skirt section extending from said head toward said base;

a shaft axially and rotatably movably mounted in said base in axial alignment with said piston and having an outer end extending outwardly of said base, an inner end axially aligned with said piston head, and means thereon for imparting rotational and axial forces and movements thereto;

an annular thrust member on said piston in said recess at said piston head and receiving said shaft therethrough;

a resetting ramp member mounted in said piston skirt at an oblique angle to the piston axis and in axially spaced relation to said thrust member;

a retainer member mounted in said piston skirt in axially spaced relation to said ramp member and on the opposite side thereof from said thrust member;

and annular lock plate means mounted on said shaft for relative sliding movement in the axial direction toward said piston head and locking action on said shaft for attempted relative sliding movement in the other axial direction;

said retainer engaging one edge of said lock plate means at a first circumferentially definite point upon a predetermined amount of movement of said piston and said retainer, under the force of brake actuating pressure in said pressure chamber, relative to said shaft to cause said lock plate means to slide axially on said shaft to adjust the piston position for brake wear;

said lock plate means operatively engaging said thrust member at the opposite edge at a second circumferentially definite point in substantial axially parallel alignment with said first circumferentially definite point upon a predetermined amount of axial movement of said shaft toward said piston head to cause said lock plate means to lock to said shaft and act through said thrust member to move said piston in the brake actuating direction; said ramp member normally being clear of said lock plate means but by rotation of said piston said ramp member being positioned to engage said lock plate means on said opposite edge at a third circumferentially definite point circumferentially spaced on said lock plate means from said second circumferentially definite point to unlock said lock plate means and said shaft and allow said lock plate means to be pushed in axially sliding movement relative to said shaft toward said cylinder base by said piston to reset said piston when new linings are installed.

* * * * *